United States Patent

Krupa et al.

[15] 3,668,561

[45] June 6, 1972

[54] FIELD EFFECT TRANSISTOR MODULATOR CIRCUIT

[72] Inventors: John Eugene Krupa; Mario Robert Paglee, both of Moorestown, N.J.

[73] Assignee: RCA Corporation

[22] Filed: June 29, 1970

[21] Appl. No.: 50,625

[52] U.S. Cl. ....................332/31 T, 332/43

[51] Int. Cl. ....................H03c 1/36

[58] Field of Search ....................332/31, 31 T, 43, 24, 16 T; 307/304; 331/38

[56] References Cited

UNITED STATES PATENTS 3,371,290 2/1968 Kibler ....................332/31

*Primary Examiner*—John Kominski
*Attorney*—Edward J. Norton

[57] ABSTRACT

A modulator circuit employing two dual gate field effect transistors. A carrier signal is applied to one gate of each transistor in a push-pull arrangement. A modulating signal is applied to the other gate of each transistor in parallel. The modulated output signal appears between the drains of the transistors.

4 Claims, 7 Drawing Figures

Figures 1, 2A, 2B, 2C, 2D, 2E, 2F:
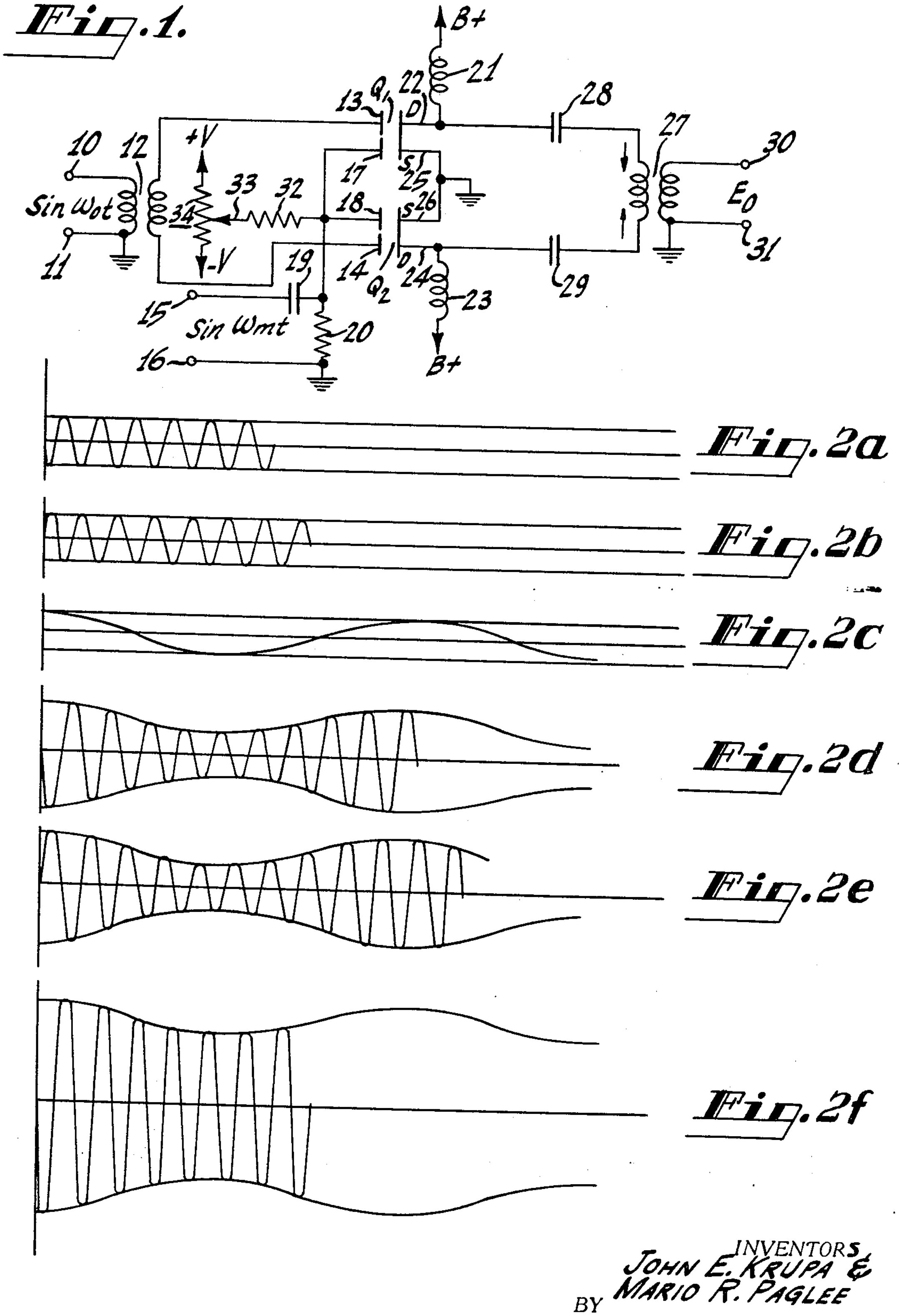

INVENTORS
JOHN E. KRUPA &
MARIO R. PAGLEE
BY
Edward J. Norton
Attorney

FIELD EFFECT TRANSISTOR MODULATOR CIRCUIT

The invention herein described was made in the course of or under a contract or subcontract thereunder with the Department of the Air Force.

This invention relates to modulator circuits generally and more specifically to modulator circuits using solid state field effect devices.

Modulator circuits, in general, use non-linear devices such as diodes to generate a modulated signal. In modulators which use a space-charge device to perform the signal multiplying function, the plate current varries as the three-halves power of the plate potential. That is;

$$I_b = GE_b{}^{3/2} \qquad (1)$$

where $I_b$ is the plate current, $G$ is a constant called the perveance which depends upon the geometry of the tube, and $E_b$ is the plate voltage. Equation (1) is a form of the Langmuir-Child law equation.

Even when a space charge device is operated in a region which is called "linear," in reality the output current still varies as the three-halves power of the plate voltage and when two signals are multiplied through the device both even and odd harmonics are produced at the output.

If the input signals to a space-charge device are complex, as is the case with a pulse input signal, then the output signal contains virtually a continuous spectrum of undesired signals. The presence of undesired harmonics generally requires a complicated system of filtering following the modulator circuit. The filtering requirements place a severe bandwidth restriction upon the operation of the modulator circuit.

The present invention overcomes the problems inherent in the utilization of non-linear devices in modulator circuits by providing a modulator circuit wherein a first and a second solid state field effect device are utilized. Each device has two control electrodes and two main electrodes. Corresponding main electrodes of the respective devices are connected together. Means for operatively biasing the devices is connected to each of the other main electrodes. Means are provided for coupling a first signal to one control electrode of one device and for simultaneously coupling another signal corresponding to the first shifted by 180° to one control electrode of the other device. Additional means are provided for simultaneously coupling a second signal to each of the other control electrodes. Means are connected to the main electrodes which carry the multiplied input signals for providing the signals which appear at these main electrodes at a pair of output terminals.

Modulator circuits employing the invention described herein are capable of providing a modulated output signal with undesirable harmonics and cross-products at least a thousand times lower than modulators utilizing non-linear electron tube devices. The linear characteristics of a modulator employing the present invention provide a modulator with low noise, high dynamic range and low distortion.

In the figures

FIG. 1 is a circuit diagram of a modulator circuit embodying an embodiment of the present invention; and FIG. 2*a* through 2*f* is a plot of various waveforms appearing in the circuit of FIG. 1.

Referring now to FIG. 1, a signal to be modulated sin $\omega_0 t$, is applied to terminals 10 and 11 from a source (not shown). The ends of the primary winding of transformer 12 are respectively connected to terminals 10 and 11. Terminal 11 is returned to a common point. The ends of the secondary winding of transformer 12 are respectively connected to gate 13 of the dual gate field effect transistor $Q_1$ and gate 14 of the dual gate field effect transistor $Q_2$.

The effect of the arrangement of transformer 12 with respect to the input signal sin $\omega_0 t$ and gate 13 of $Q_1$ and gate 14 of $Q_2$ is to provide input signals in push-pull to the two transistors $Q_1$ and $Q_2$.

FIG. 2a shows the waveform appearing at gate 13 of transistor $Q_1$ and FIG. 2b shows the waveform of the signal appearing at gate 14 of transistor $Q_2$. It is desirable to have the waveform of FIG. 2*a* and 2*b* at approximately equal amplitudes while being 180° out of phase with respect to each other. Therefore, it may be desirable to provide some type of compensation (not shown) in the gate circuitry connected to gates 13 and 14 to account for any differences which may exist in the characteristics of transistors $Q_1$ and $Q_2$ looking into their respective gates.

Ideally, the two transistors $Q_1$ and $Q_2$ should be identical. It is therefore preferable that transistors $Q_1$ and $Q_2$ be formed on a single integrated circuit chip to insure matched characteristics.

A modulating signal sin $\omega_m t$ is applied to terminals 15 and 16 from a source (not shown). Terminal 16 is returned to a common point. The modulating signal is respectively a.c. coupled to gates 17 and 18 of transistors $Q_1$ and $Q_2$ through the network comprising capacitor 19 and resistor 20. If required, additional circuitry may be connected to gates 17 and 18 to insure that equal amplitude signals appear at gates 17 and 18.

For example, a variable resistor may be connected in series with each of gate 17 and 18 to provide an adjustment of the amplitude of the signals coupled to the respective gates.

FIG. 2*c* shows the modulating waveform appearing simultaneously at gates 17 and 18.

The modulator circuit will work most efficiently when field effect transistors $Q_1$ and $Q_2$ are operated in a region wherein the resistance of each device is a linear function of the signals applied to the gates of each device.

The dual gate transistors operate in such a linear fashion when properly biased and when relatively small signal swings are applied to their gates.

One arrangement for biasing gates 17 and 18 is to connect one end of a large resistor 32, on the order of one megohm, to the junction point of gates 17 and 18, the other end of resistor 32 being connected to the center arm 33 of a variable resistor 34. One of the fixed ends of resistor 34 is connected to a supply +V, while the other end of resistor 34 is connected to a supply −V. The biasing arrangement for gates 17 and 18 shown in FIG. 1 provides the capability of biasing the gates 17 and 18 anywhere in the linear resistive region of transistors $Q_1$ and $Q_2$.

In the event that the signal applied to terminals 15 and 16 is a chain of positive going pulses, it may be desirable to set the variable arm 33 of resistor 34 to a point wherein transistors $Q_1$ and $Q_2$ will operate from a point which is approximately ten percent into the linear resistive region of operation.

With the symmetrical modulating signal sin $\omega_m t$ applied to terminals 15 and 16, it is desirable to set the variable arm 33 of resistor 34 such that transistors $Q_1$ and $Q_2$ will operate in the center of the linear resistive region of operation.

The main electrode biasing for transistors $Q_1$ and $Q_2$ is provided by means of a d.c. supply B+. The d.c. supply voltage is coupled through choke 21 to the drain electrode 22 of transistor $Q_1$ and is supplied through choke 23 to the drain electrode 24 of transistor $Q_2$. Source electrode 25 of transistor $Q_1$ is connected to source electrode 26 of transistor $Q_2$ and both are returned to a common point.

Alternatively, main electrode biasing may be accomplished by connecting a negative supply voltage to electrodes 25 and 26 with electrodes 22 and 24 each being returned to a common point through the chokes 21 and 23 respectively.

The d.c. voltage supply, B+, is adjusted such that the resistances of both transistor $Q_1$ and $Q_2$ will vary linearly with the voltage swings applied to their respective gates.

The output signal appearing at the drain electrode 22 of transistor $Q_1$ is the rapidly varying signal appearing at the gate electrode 13 modulated by the slowly varying signal appearing at the gate electrode 17. The waveform appearing at electrode 22 is shown in FIG. 2d.

The waveform appearing at electrode 24 of transistor $Q_2$ is the signal appearing at gate 14 modulated by the signal appearing at gate 18 of transistor $Q_2$. The waveform appearing at electrode 24 is shown in FIG. 2e.

The signals appearing at electrodes 22 and 24 are respectively coupled to the ends of the primary winding of transformer 27 via capacitors 28 and 29. FIGS. 2d and 2e show that when one end of the primary winding of transformer 27 goes positive, the other end of the primary winding is going negative. The result is that the voltage difference appearing across the primary winding of transformer 27 is twice the amplitude of either signal appearing at electrodes 22 or 24. The secondary winding of transformer 27 has its ends connected to output terminals 30 and 31 respectively. The output terminal 31 is returned to a common point.

With the output terminal 31 returned to a common point, the output voltage, $E_0$, has the general configuration of the waveshape appearing at the electrode 22 of transistor $Q_1$ with the exception that the amplitude of $E_0$ is twice that of the signal at electrode 22. FIG. 2f is a plot of the output voltage, $E_0$.

If the output terminal 30 is returned to a common point, the output waveshape, $E_0$, will have the general configuration of the signal appearing at the drain electrode 24 of transistor $Q_2$ in that the phase relationship of the signal at electrode 24 will be preserved through the transformer 27.

In some applications it may be desirable to practice the present invention using dual gate field effect transistors having complimentary symmetry. When devices having complimentary symmetry are used the signal to be modulated is applied to the respective gates simultaneously and in phase. The modulating signal is applied to the other gates of each device in push-pull. The result, with respect to the output signals appearing at the appropriate main electrodes of each device, is directly analogous to the signals appearing at electrodes 22 and 24 of $Q_1$ and $Q_2$, respectively, in the preferred embodiment shown in FIG. 1.

The dual gate field effect transistor (FET) is especially adaptable to the present invention since it has a transfer characteristic (drain current $I_d$ as a function of gate 1 voltage Vg) which very closely approximates a quadric curve over a fairly large range of voltages on gate 2.

The instantaneous drain current in a dual gate FET, such as $Q_1$ of FIG. 1, may be expressed by:

$$I_d = [I_0 + \alpha_1 Vg_1 + \beta Vg_1{}^2]\,[K + \rho Vg_2] \qquad (2)$$

where $I_o$, $\alpha$, and $\beta$, are determined by the fixed bias on gate 1, and $Vg_1$ is the instantaneous R. F. voltage on gate 1. $K$ and $\rho$ are determined by the bias on gate 2, and $Vg_2$ is the instantaneous modulating voltage on gate 2.

A similar expression holds for the drain current for the FET $Q_2$ shown in FIG. 1.

If an R. F. voltage E sin $\omega_o t$ is applied to the terminals 10 and 11 the voltage on control electrode 13 will be E sin $\omega_o t$ while the voltage on control electrode 14 will be –E sin $\omega_o t$ because of the polarity of transformer 12. Substituting E sin $\omega_o t$ for $Vg_1$ in equation (2) we have:

$$I_{d_1} = [I_o + \alpha E \sin \omega_o t + (\beta/2)\,(1 - \cos 2\omega_o t)\,]\,[K + \rho Vg_2] \qquad (3)$$

For the drain current in $Q_2$ we have:

$$I_{d_2} = [I_o - \alpha E \sin \omega_o t + (\beta/2)\,(1 - \cos 2\omega_o t)\,]\,[K + \rho Vg_2] \qquad (4)$$

The resultant current through the output transformer 27 is:

$$I_{d_1} - I_{d_2} = 2\,\alpha E \sin \omega_o t\,[K + \rho Vg_2] \qquad (5)$$

If $Vg_2$ is a modulating voltage $E_2 \sin \omega_m t$, then the output current will be:

$$I_o = 2\,\alpha E \sin \omega_o t\,[K + \rho E_2 \sin \omega_m t] \qquad (6)$$

$$I_o = 2\,\alpha \rho E E_2 \sin \omega_o t(\sin \omega_m t) + 2\alpha K E \sin \omega_o t$$

$$I_o = \alpha \rho E E_2 [\cos (\omega_o + \omega_m)\,t - \cos (\omega_o - \omega_m)\,t] + 2\alpha K E \sin \omega_o t$$

Equation (8) shows that the output will consist of the upper and lower side bands and a carrier signal but no higher order terms are present. Thus modulation is achieved without the usual harmonics which accompany non-linear modulating devices.

What is claimed is:

1. A modulator circuit comprising:

a first and second field effect transistor each having a first gate electrode, a second gate electrode, a drain electrode and a source electrode, the source electrodes of said transistors being connected together at a point of reference potential;

a first biasing means connected to the drain electrode of each transistor;

a second biasing means, including a source of potential and a variable resistor, connected to the second gate electrode of each transistor for providing substantially linear resistive operation of each transistor;

a first transformer having a primary and a secondary winding, one end of the secondary winding of said first transformer being connected to the first gate electrode of the first transistor, the other end of the secondary winding of said first transformer being connected to the first gate electrode of the second transistor, one end of the primary winding of the first transformer being connected to said point of reference potential;

means for applying a first signal between the ends of the primary winding of said first transformer;

means including a capacitor for simultaneously coupling a second signal to the second gate electrode of each device;

a second transformer having a primary and a secondary winding, one end of the secondary winding of said second transformer being connected to said point of reference potential;

means including a first coupling capacitor for connecting one end of the primary winding of said second transformer to the drain electrode of said first transistor;

means including a second coupling capacitor for connecting the other end of the primary winding of said second transformer to the drain electrode of said second transistor; and a pair of output terminals connected to the ends of the secondary winding of the second transformer for providing an output signal.

2. The modulator circuit according to claim 1 wherein said first and said second transistors are substantially similar devices.

3. The modulator circuit according to claim 1 wherein said second signal is symmetrical and wherein said second biasing means is adjusted to bias said transistors in substantially the center of their respective linear resistive regions of operation.

4. The modulator circuit according to claim 1 wherein said second signal is a chain of positive going pulses and said second biasing means is adjusted to bias said transistors at substantially one end of their respective linear resistive regions of operation.

* * * * *